(12) United States Patent
Miyatani et al.

(10) Patent No.: US 11,295,142 B2
(45) Date of Patent: Apr. 5, 2022

(54) INFORMATION PROCESSING APPARATUS, INFORMATION PROCESSING METHOD, AND NON-TRANSITORY COMPUTER-READABLE STORAGE MEDIUM

(71) Applicant: CANON KABUSHIKI KAISHA, Tokyo (JP)

(72) Inventors: Sonoko Miyatani, Tokyo (JP); Masakazu Fujiki, Kawasaki (JP); Kazuhiko Kobayashi, Yokohama (JP); Masahiro Suzuki, Kawasaki (JP); Makoto Tomioka, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 117 days.

(21) Appl. No.: 16/235,244

(22) Filed: Dec. 28, 2018

(65) Prior Publication Data
US 2019/0220676 A1 Jul. 18, 2019

(30) Foreign Application Priority Data
Jan. 15, 2018 (JP) .............................. JP2018-004471

(51) Int. Cl.
*G01C 21/36* (2006.01)
*G05D 1/02* (2020.01)
*G06K 9/00* (2006.01)
*G06K 9/62* (2006.01)
(Continued)

(52) U.S. Cl.
CPC ..... *G06K 9/00791* (2013.01); *G01C 21/3602* (2013.01); *G05D 1/0251* (2013.01); *G06K 9/2081* (2013.01); *G06K 9/6262* (2013.01); *G06K 9/6267* (2013.01); *G06T 7/73* (2017.01); *G06T 7/74* (2017.01); *G06T 2207/20081* (2013.01); *G06T 2207/20101* (2013.01); *G06T 2207/30244* (2013.01)

(58) Field of Classification Search
CPC ............ G01C 21/3602; G05D 1/0251; G06K 9/00791; G06K 9/2081; G06K 9/6262; G06K 9/6267; G06T 7/73; G06T 7/74; G06T 2207/20101; G06T 2207/20081; G06T 2207/30244
See application file for complete search history.

(56) References Cited

U.S. PATENT DOCUMENTS

| | | | |
|---|---|---|---|
| 5,144,685 A * | 9/1992 | Nasar | G05D 1/0246 348/119 |
| 8,498,491 B1 * | 7/2013 | Steffens | G06K 9/6292 382/224 |

(Continued)

OTHER PUBLICATIONS

Sohn et al. ("Combining evolving neural network classifiers using bagging," Proceedings of the International Joint Conference on Neural Networks; Date of Conference: Jul. 20-24, 2003) (Year: 2003).*

(Continued)

*Primary Examiner* — Yubin Hung
(74) *Attorney, Agent, or Firm* — Rossi, Kimms & McDowell LLP

(57) ABSTRACT

Of a plurality of learning models learned to output geometric information corresponding to a captured image, a learning model corresponding to a setting region is acquired.

16 Claims, 12 Drawing Sheets

(51) Int. Cl.
*G06T 7/73* (2017.01)
*G06K 9/20* (2006.01)

(56) References Cited

U.S. PATENT DOCUMENTS

| | | | | |
|---|---|---|---|---|
| 8,995,716 B1* | 3/2015 | Zomet | G06K 9/00664 | 382/103 |
| 9,091,561 B1* | 7/2015 | Weir | G01C 21/3617 | |
| 9,849,835 B2* | 12/2017 | Dollinger | G06T 11/00 | |
| 2006/0008151 A1* | 1/2006 | Lin | G06K 9/6292 | 382/190 |
| 2006/0136129 A1* | 6/2006 | Yokozawa | G01C 21/3623 | 701/434 |
| 2009/0103794 A1* | 4/2009 | Sathyanarayana | G06T 7/90 | 382/131 |
| 2010/0305844 A1* | 12/2010 | Choi | G01C 21/3423 | 701/533 |
| 2012/0232793 A1* | 9/2012 | Hagiwara | G01C 21/28 | 701/518 |
| 2014/0012434 A1* | 1/2014 | Spence | G05D 1/0011 | 701/2 |
| 2015/0178572 A1* | 6/2015 | Omer | G08G 1/0141 | 382/108 |
| 2017/0241794 A1* | 8/2017 | Koo | G01C 21/3617 | |
| 2017/0369057 A1* | 12/2017 | Gurghian | B60W 30/12 | |
| 2018/0025542 A1* | 1/2018 | Upendran | G06K 9/00637 | 345/420 |
| 2018/0164812 A1* | 6/2018 | Oh | G06N 3/02 | |
| 2018/0276807 A1* | 9/2018 | Kish | G06T 7/001 | |
| 2018/0293711 A1* | 10/2018 | Vogels | G06K 9/6267 | |
| 2019/0156122 A1* | 5/2019 | Lu | G06F 16/56 | |
| 2019/0161104 A1* | 5/2019 | Betis | G06K 9/00791 | |
| 2019/0164312 A1* | 5/2019 | Sunkavalli | G06N 3/0454 | |
| 2019/0213451 A1* | 7/2019 | Schafer | G06N 3/08 | |
| 2019/0266449 A1* | 8/2019 | Viola | G06N 3/0454 | |
| 2020/0109959 A1* | 4/2020 | Wu | G01C 21/3492 | |

OTHER PUBLICATIONS

Tateno et al. "CNN-SLAM: Real-time dense monocular SLAM with learned depth prediction." IEEE Computer Society Conference on Computer Vision and Pattern Recognition (CVPR). 2017: 1-10. Cited in the Specification.

* cited by examiner

INFORMATION PROCESSING APPARATUS, INFORMATION PROCESSING METHOD, AND NON-TRANSITORY COMPUTER-READABLE STORAGE MEDIUM

BACKGROUND OF THE INVENTION

Field of the Invention

The present invention relates to an information processing technique of handling a learning model.

Description of the Related Art

Measurement of the position and orientation of an image capturing device based on image information is used for various purposes such as the alignment between a physical space and a virtual object in mixed reality/augmented reality, self-position estimation of a robot or an automobile, and three-dimensional modeling of an object or a space.

K. Tateno, F. Tombari, I. Laina, and N. Navab, "CNN-SLAM: Real-time dense monocular SLAM with learned depth prediction", IEEE Computer Society Conference on Computer Vision and Pattern Recognition (CVPR), 2017 discloses a method of estimating geometric information (depth information), which is an index used to calculate a position and orientation, from an image using a learning model learned in advance and calculating the position and orientation based on the estimated depth information.

In K. Tateno, F. Tombari, I. Laina, and N. Navab, "CNN-SLAM: Real-time dense monocular SLAM with learned depth prediction", IEEE Computer Society Conference on Computer Vision and Pattern Recognition (CVPR), 2017, a learning model needs to be prepared in advance. However, it is difficult to prepare a learning model that covers all scenes because it takes much time and labor.

SUMMARY OF THE INVENTION

The present invention provides a technique of efficiently performing preparation of a learning model.

According to the first aspect of the present invention, there is provided an information processing apparatus comprising: a setting unit configured to set a setting region; and an acquisition unit configured to acquire, of a plurality of learning models learned to output geometric information corresponding to a captured image, a learning model corresponding to the setting region.

According to the second aspect of the present invention, there is provided an information processing apparatus comprising: a presentation unit configured to present, for each of a plurality of learning models learned to output geometric information corresponding to a captured image, information representing a region including an image capturing position of the captured image; and an acquisition unit configured to acquire a learning model corresponding to information selected by a user from the pieces of information presented by the presentation unit.

According to the third aspect of the present invention, there is provided an information processing method performed by an information processing apparatus, comprising: setting a setting region; and acquiring, of a plurality of learning models learned to output geometric information corresponding to a captured image, a learning model corresponding to the setting region.

According to the fourth aspect of the present invention, there is provided an information processing method performed by an information processing apparatus, comprising: presenting, for each of a plurality of learning models learned to output geometric information corresponding to a captured image, information representing a region including an image capturing position of the captured image; and acquiring a learning model corresponding to information selected by a user from the pieces of presented information.

According to the fifth aspect of the present invention, there is provided a non-transitory computer-readable storage medium storing a computer program configured to cause a computer to function as: a setting unit configured to set a setting region; and an acquisition unit configured to acquire, of a plurality of learning models learned to output geometric information corresponding to a captured image, a learning model corresponding to the setting region.

According to the sixth aspect of the present invention, there is provided a non-transitory computer-readable storage medium storing a computer program configured to cause a computer to function as: a presentation unit configured to present, for each of a plurality of learning models learned to output geometric information corresponding to a captured image, information representing a region including an image capturing position of the captured image; and an acquisition unit configured to acquire a learning model corresponding to information selected by a user from the pieces of information presented by the presentation unit.

Further features of the present invention will become apparent from the following description of exemplary embodiments with reference to the attached drawings.

DESCRIPTION OF THE EMBODIMENTS

The embodiments of the present invention will now be described with reference to the accompanying drawings. Note that the embodiments to be described below are examples of detailed implementation of the present invention or detailed examples of the arrangement described in the appended claims.

First Embodiment

In this embodiment, an example of a system applied to a car navigation apparatus for performing guidance to a destination point will be described. More specifically, a region is set based on a route from a departure point to a destination point obtained from the car navigation apparatus, and a learning model corresponding to the set region is acquired. The learning model is a model used to estimate corresponding geometric information from an input image and is, for example, a CNN (Convolutional Neural Network) in this embodiment. The geometric information is a depth map that holds a depth value corresponding to each pixel of the input image. The learning model is generated by learning in advance (already learned) based on a plurality of images and a plurality of depth maps obtained by capturing the same field at the same time as the images such that when an image is input, a corresponding depth map can be estimated. Note that in this embodiment, the application purpose of the estimated geometric information is not particularly limited and can be used, for example, for control such as collision prediction and collision avoidance.

Figure 1:
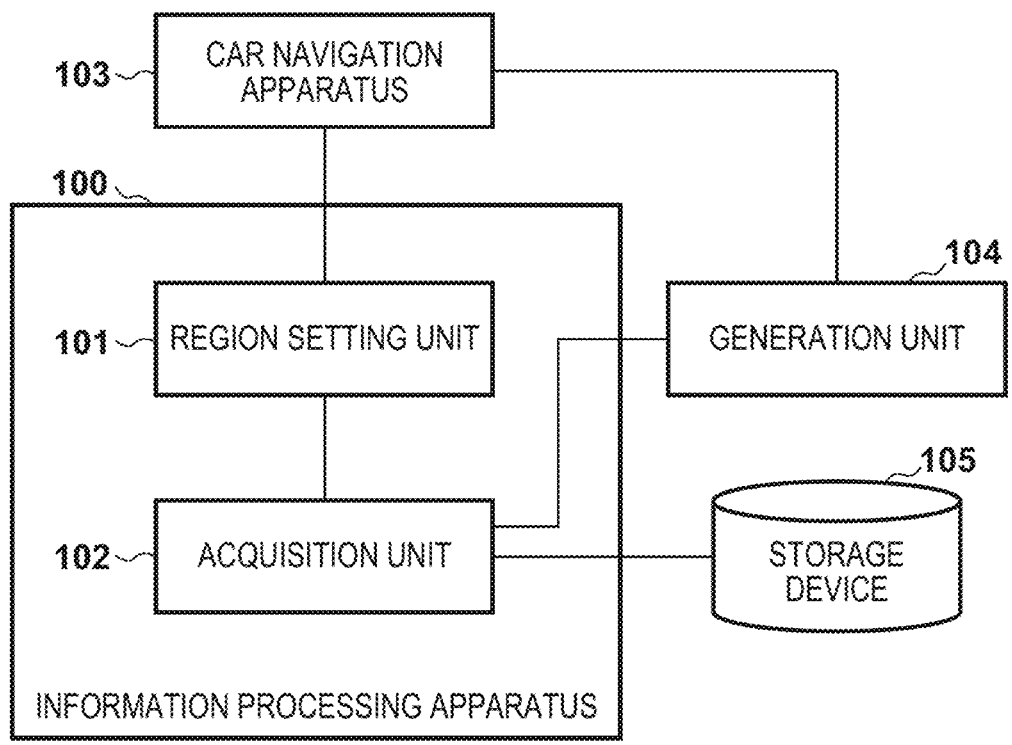
FIG. 1 is a block diagram showing an example of the functional arrangement of a system.

An example of the functional arrangement of the system according to this embodiment will be described first with reference to the block diagram of FIG. 1. As shown in FIG. 1, the system according to this embodiment includes a car navigation apparatus 103, an information processing apparatus 100, a generation unit 104, and a storage device 105. Note that FIG. 1 shows the car navigation apparatus 103, the information processing apparatus 100, the generation unit 104, and the storage device 105 as separate devices. However, two or more of these devices may be formed as one device.

The car navigation apparatus 103 will be explained first. The car navigation apparatus 103 includes a GPS that acquires the current position of itself, and a display screen that displays various kinds of information including a map image. Additionally, in the car navigation apparatus 103, map images of various regions are registered in various scales. A current position measured by the GPS or a map image on the periphery of a position designated by operating the car navigation apparatus 103 by the user is displayed on the display screen. When the user performs an operation of setting a destination point by operating the car navigation apparatus 103, the car navigation apparatus 103 obtains a route from the departure point (current position) to the destination point. Then, the car navigation apparatus 103 displays information concerning the obtained route on the display screen, and outputs the information concerning the route as route information to the information processing apparatus 100. The route information includes "the position of the departure point", "the position of the destination point", and "the position of a way point on the route from the departure point to the destination point". "The position of the departure point", "the position of the destination point", and "the position of the way point" are represented by, for example, latitudes and longitudes.

The storage device 105 will be described next. In the storage device 105, a plurality of learning models learned to output corresponding geometric information when a captured image is input are registered. Each of the plurality of learning models is, for example, a learning model generated by the following learning processing. That is, for each learning data, the difference between geometric information output from a learning model when a captured image included in the learning data is input to the learning model and geometric information (training data) included in the learning data is obtained. Then, the learning model is updated so as to minimize the sum of the differences obtained for the learning data. When learning processing is performed using learning data under a condition (learning environment) that changes between the learning models, learning models corresponding to conditions different from each other can be generated. Note that for each learning model registered in the storage device 105, information (image capturing position information) representing the image capturing position (for example, latitude and longitude) of each captured image used in the learning processing of the learning model is associated. Note that any learning model can be used as long as it outputs corresponding geometric information when an image is input. For example, a model of machine learning may be used as a learning model, and the learning model is not limited to a CNN.

The information processing apparatus 100 will be described next. As shown in FIG. 1, the information processing apparatus 100 includes a region setting unit 101, and an acquisition unit 102. The region setting unit 101 sets a setting region based on information acquired from the car navigation apparatus 103. In this embodiment, the region setting unit 101 acquires route information from the car navigation apparatus 103. For each of "the position of the departure point", "the position of the destination point", and "the position of the way point" included in the route information, the region setting unit 101 according to this embodiment sets a region including the position as a setting region. For example, for each of "the position of the departure point", "the position of the destination point", and "the position of the way point", the region setting unit 101 sets, as a setting region, a circular or rectangular region with respect to the position as the center (the range of a latitude and a longitude with respect to the position as the center). Note that the setting region is not limited to a circular region or a rectangular region and may be, for example, the region of an administrative district (a town, a city, a prefecture, or the like) including each of "the position of the departure point", "the position of the destination point", and "the position of the way point".

The acquisition unit 102 determines, for each learning model registered in the storage device 105, whether the number of pieces of image capturing position information representing image capturing positions in the setting region in pieces of image capturing position information associated with the learning model is N (N is an integer of one or more) or more. The acquisition unit 102 decides, as an acquisition target, a learning model for which it is determined that "the number of pieces of image capturing position information representing image capturing positions in the setting region is N or more", and acquires the learning model of the decided acquisition target from the storage device 105. The acquisition unit 102 thus acquires learning models that have used, in learning processing, images captured in regions on and near the route obtained by the car navigation apparatus 103.

Figure 3:
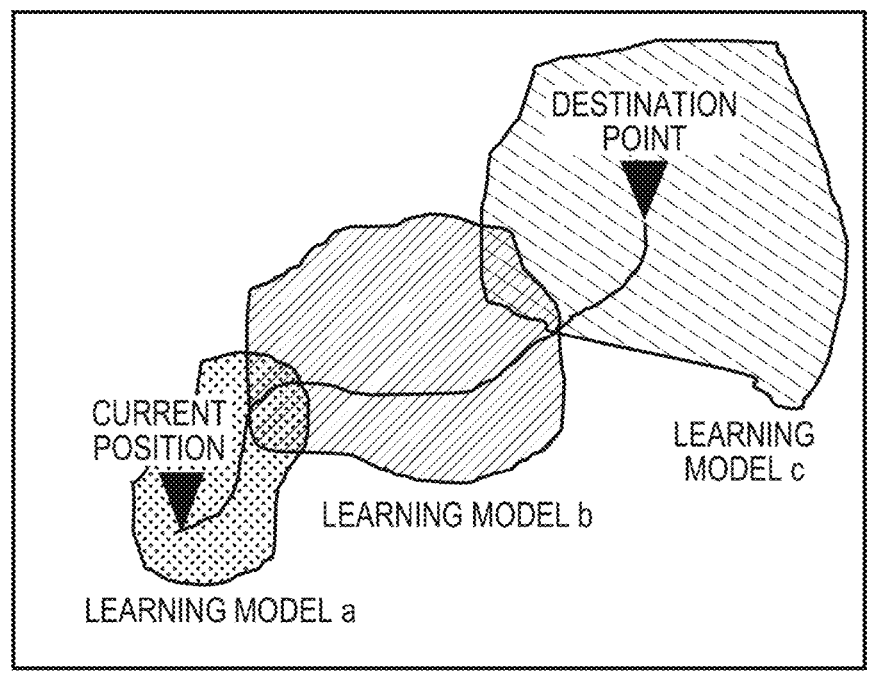
FIG. 3 is a view showing an example of display of learning model information.

The generation unit 104 will be described next. The generation unit 104 generates display information to be displayed on the display screen of a display device such as the display screen of the car navigation apparatus 103. The generation unit 104 according to this embodiment generates, as learning model information, information concerning a learning model that the acquisition unit 102 has acquired from the storage device 105. For example, the generation unit 104 generates learning model information including information such as the file name of a learning model acquired by the acquisition unit 102, the generation date/time of the learning model, and the image capturing date/time and image capturing position of a captured image used for learning of the learning model. Then, the generation unit 104 outputs the generated learning model information to the car navigation apparatus 103. A list of learning model information concerning learning models that have learned using images captured in regions on and near the route obtained by the car navigation apparatus 103 is displayed on the display screen of the car navigation apparatus 103 (FIG. 3). As shown in FIG. 3, the names of a learning model a, a learning model b, and a learning model c acquired by the acquisition unit 102 and the application ranges of the learning models are displayed on the display screen of the car navigation apparatus 103 in addition to the departure point, the destination point, and the route between the departure point and the destination point. The learning model a is a learning model that has used, in learning processing, images captured at the departure point and on the periphery of it. The learning model b is a learning model that has used, in learning processing, images captured at the way point and on the periphery of it. The learning model c is a learning model that has used, in learning processing, images captured at the destination point and on the periphery of it. The application range of the learning model a is a region encompassing an image capturing position group represented by an image capturing position information group associated with the learning model a. The application range of the learning model b is a region encompassing an image capturing position group represented by an image capturing position information group associated with the learning model b. The application range of the learning model c is a region encompassing an image capturing position group represented by an image capturing position information group associated with the learning model c.

Figure 2:
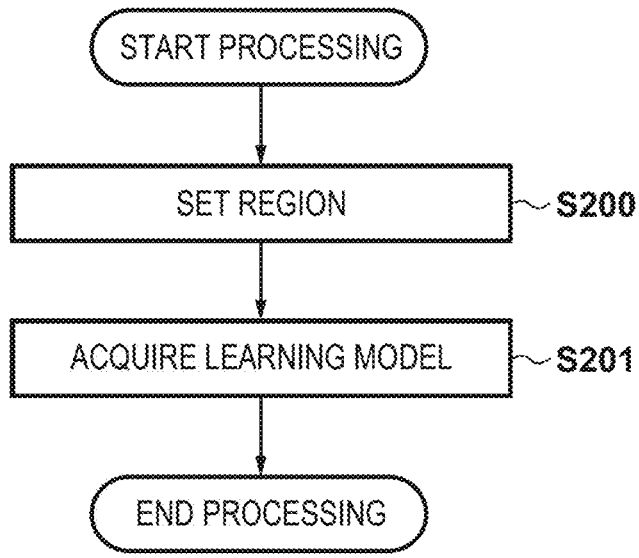
FIG. 2 is a flowchart of processing performed by an information processing apparatus 100.

Processing performed by the information processing apparatus 100 according to this embodiment will be described next with reference to the flowchart of FIG. 2. The processing according to the flowchart of FIG. 2 is processing performed by the information processing apparatus 100 after the region setting unit 101 acquires route information from the car navigation apparatus 103.

In step S200, for each of "the position of the departure point", "the position of the destination point", and "the position of the way point" included in the route information acquired from the car navigation apparatus 103, the region setting unit 101 sets a region including the position as a setting region.

In step S201, the acquisition unit 102 determines, for each learning model registered in the storage device 105, whether the number of pieces of image capturing position information representing image capturing positions in the setting region in pieces of image capturing position information associated with the learning model is N or more. The acquisition unit 102 decides, as an acquisition target, a learning model for which it is determined that "the number of pieces of image capturing position information representing image capturing positions in the setting region is N or more", and acquires the learning model of the decided acquisition target from the storage device 105.

Note that if there is no learning model for which "the number of pieces of image capturing position information representing image capturing positions in the setting region is N or more", estimation of geometric information may be inhibited in the setting region. In addition, if there are a plurality of learning models for which "the number of pieces of image capturing position information representing image capturing positions in the setting region is N or more", geometric information may be estimated from the plurality of learning models, as in the third embodiment to be described later.

As described above, according to this embodiment, a learning model corresponding to the route from the departure point to the destination point and its periphery can be acquired. Note that as for the image capturing position of each captured image, for example, image capturing positions may be acquired for several representative captured images, and the image capturing positions of the remaining captured images may be obtained by interpolation from the image capturing positions of the several representative captured images. Alternatively, in place of the image capturing positions, a free-form curve created from all the image capturing positions may be registered in the storage device 105. In this case, each image capturing position is represented as a position on the free-form curve. Otherwise, the image capturing position group may be divided by putting relatively close positions into one group, and in each group, image capturing positions belonging to the group may be changed to the representative image capturing position of the group (the average image capturing position of the image capturing positions belonging to the group).

<First Modification>

In the following embodiments and modifications including this modification, the differences from the first embodiment will be described. The rest is assumed to be the same as in the first embodiment unless it is specifically stated otherwise. In the first embodiment, a learning model corresponding to peripheral regions including a departure point, a destination point, and a way point is acquired. However, a learning model corresponding to the peripheral region of one of the points may be acquired. For example, when acquiring a learning model corresponding to the periphery of a destination point designated by the user in the car navigation apparatus 103, the processing is different from the first embodiment in that the following processing is performed in step S200 of FIG. 2. Note that in the following explanation, when "destination point" is replaced with "departure point" or "way point" or "current position measured by the GPS", a learning model corresponding to the periphery of the departure point, the periphery of the way point, or the periphery of the current position can be acquired.

In step S200, the region setting unit 101 sets, as the setting region, a region including "the position of the destination point" included in the route information acquired from the car navigation apparatus 103. This makes it possible to acquire a learning model corresponding to the periphery of the destination point.

<Second Modification>

In this modification, a learning model corresponding to a region designated by the user in the car navigation apparatus 103 is acquired. When the user designates, as a designated region, a circular or rectangular region on the display screen of the car navigation apparatus 103, the car navigation apparatus 103 outputs information (designated region information) defining the designated region to the information processing apparatus 100. For example, in a case in which the designated region is a circular region, the designated region information represents a latitude and a longitude corresponding to the center of the circular region, and a distance corresponding to the radius of the circular region (the actual radius that can be calculated from the scale of the map image and the radius of the circular region on the display screen). Additionally, for example, in a case in which the designated region is a rectangular region, the designated region information represents latitudes and longitudes corresponding to the upper left corner and the lower right corner of the rectangular region. The region setting unit 101 sets, as the setting region, the designated region represented by the designated region information output from the car navigation apparatus 103. The operation of the acquisition unit 102 is the same as in the first embodiment.

In this modification, the processing is different from the first embodiment in that the following processing is performed in step S200 of the flowchart shown in FIG. 2. In step S200, the region setting unit 101 sets, as the setting region, a designated region represented by designated region information output from the car navigation apparatus 103. This makes it possible to acquire a learning model corresponding to the region designated by the user on the map.

Note that the designation method of the designated region is not limited to a specified designation method. For example, a list of addresses or place names may be displayed on the display screen of the car navigation apparatus 103, and a region corresponding to an address or place name designated by the user in the list may be set as the designated region. Alternatively, a region corresponding to an address or place name input by the user as a text or voice may be set as the designated region. The setting region may include the designated region and the peripheral region of the designated region.

<Third Modification>

In this modification, a learning model corresponding to a current position is acquired from the storage device 105. The car navigation apparatus 103 according to this embodiment outputs a current position measured by the GPS to the information processing apparatus 100.

The acquisition unit 102 acquires a learning model as an acquisition target, as in the first embodiment. Then, based on the current position acquired from the car navigation apparatus 103, the acquisition unit 102 selects at least one learning model to be actually acquired from the storage device 105 in the learning models of the decided acquisition targets. For example, the acquisition unit 102 acquires, from the storage device 105, a learning model associated with image capturing position information representing an image capturing position whose distance to the current position is equal to or less than a threshold. The learning model can thus be acquired in accordance with the current position.

Note that if there is no learning model associated with image capturing position information representing an image capturing position whose distance to the current position is equal to or less than the threshold, estimation of geometric information may be inhibited in the setting region. In addition, if there are a plurality of learning models associated with image capturing position information representing an image capturing position whose distance to the current position is equal to or less than the threshold, geometric information may be estimated from the plurality of learning models, as in the third embodiment to be described later.

In this modification, the processing is different from the first embodiment in that the following processing is performed in step S201 of the flowchart shown in FIG. 2. In step S201, the acquisition unit 102 acquires a learning model as an acquisition target, as in the first embodiment. Then, based on the current position acquired from the car navigation apparatus 103, the acquisition unit 102 selects at least one learning model to be actually acquired from the storage device 105 in the learning models of the decided acquisition targets. The subsequent processing is the same as in the first embodiment.

Note that the timing to acquire the learning model from the storage device 105 is not limited to the above-described example. For example, for each learning model, a time (acquisition time) needed to acquire (read out) the learning model from the storage device 105 is obtained in advance based on the data size of the learning model and the speed of data read from the storage device 105 and registered in the storage device 105. Then, the acquisition unit 102 obtains, as a reference distance, the product (distance) of the moving speed and the acquisition time of the learning model (target learning model) selected as the learning model to be acquired from the storage device 105. The "moving speed" is, for example, the moving speed of a vehicle including the car navigation apparatus 103. The acquisition unit 102 then acquires the target learning model from the storage device 105 when the distance between the current position and the image capturing position represented by one of the pieces of image capturing position information associated with the target learning model falls below the reference distance.

<Fourth Modification>

In this modification, attribute information corresponding to a captured image used at the time of learning of a learning model is associated with the learning model. For example, attribute information representing a highway is associated with a learning model learned using a captured image including the highway. Attribute information representing a general road is associated with a learning model learned using a captured image including the general road. In addition, the classification may comply with administratively defined road types. Attribute information representing a type 1 road is associated with a learning model learned using a captured image including the type 1 road, and attribute information representing a type 2 road is associated with a learning model learned using a captured image including the type 2 road. In addition, attribute information representing a type 3 road is associated with a learning model learned using a captured image including the type road, and attribute information representing a type 4 road is associated with a learning model learned using a captured image including the type 4 road.

The acquisition unit 102 specifies the attribute information of the setting region set by the region setting unit 101. For example, if the type of each road can be acquired from the car navigation apparatus 103, the acquisition unit 102 acquires the type of a road included in the setting region from the car navigation apparatus 103. Then, the acquisition unit 102 acquires, from the storage device 105, a learning model registered in the storage device 105 in association with the attribute information of the setting region.

In this modification, the processing is different from the first embodiment in that the following processing is performed in step S201 of the flowchart shown in FIG. 2. In step S201, the acquisition unit 102 specifies the attribute information of the setting region set by the region setting unit 101, and acquires, from the storage device 105, a learning model registered in the storage device 105 in association with the attribute information. The subsequent processing is the same as in the first embodiment.

The learning model can thus be acquired in accordance with the attribute of the setting region. Note that in this modification, the attribute information is information representing a road type. However, the attribute information is not limited to this and, for example, a district such as Tokyo or Hokkaido may be used as the attribute information. In this case, attribute information representing Tokyo is associated with a learning model learned using a captured image obtained by capturing Tokyo, and attribute information representing Hokkaido is associated with a learning model learned using a captured image obtained by capturing Hokkaido. It suffices that information representing an attribute can be associated with a learning model so as to know what kind of attribute a captured image used by each learning model for learning has (in what kind of learning environment the learning has been done). The acquisition unit 102 acquires attribute information from the car navigation apparatus 103, and acquires a learning model associated with the attribute information from the storage device 105. Note that the region setting unit 101 may set a setting region by designating attribute information.

Second Embodiment

In this embodiment, for each learning model, information (region information) representing a region on a map image encompassing an image capturing position group represented by an image capturing position information group associated with the learning model is presented to the user. Then, a learning model corresponding to region information selected by the user in pieces of region information presented to the user is acquired from a storage device 105.

Figure 4:
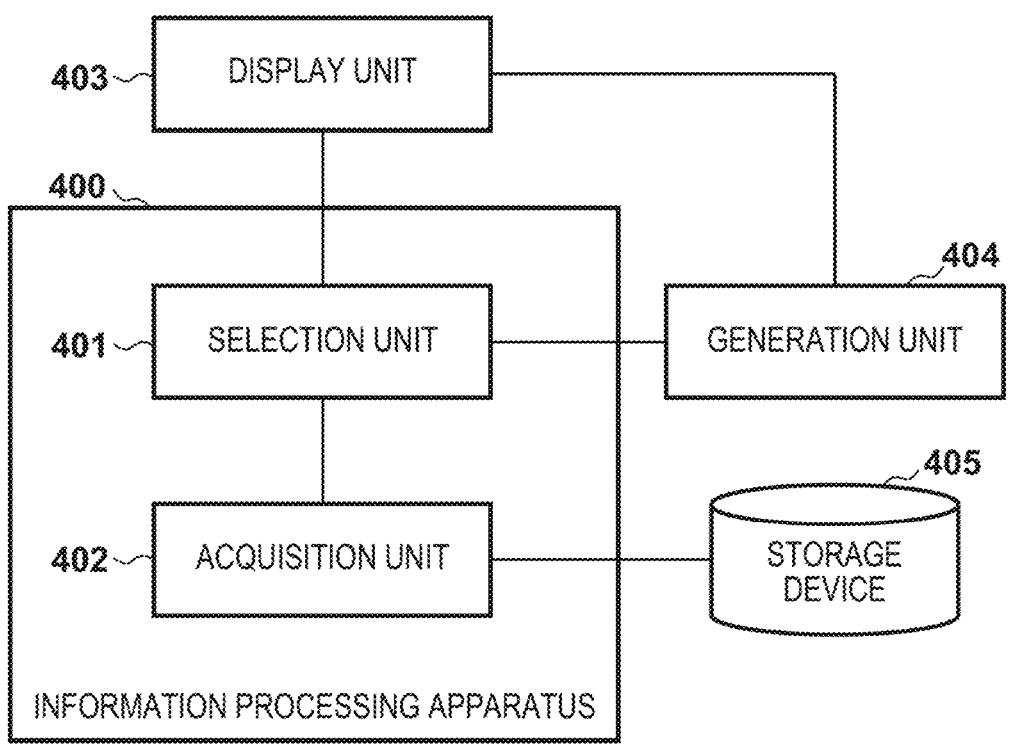
FIG. 4 is a block diagram showing an example of the functional arrangement of a system.

An example of the functional arrangement of a system according to this embodiment will be described with reference to the block diagram of FIG. 4. As shown in FIG. 4, the system according to this embodiment includes a display unit 403, a generation unit 404, a storage device 405, and an information processing apparatus 400. Note that FIG. 4 shows the display unit 403, the information processing apparatus 400, the generation unit 404, and the storage device 405 as separate devices. However, two or more of these devices may be formed as one device.

The storage device 405 will be described first. In the storage device 405, a plurality of learning models are registered in association with image capturing position information representing image capturing positions of captured images used at the time of learning of the learning models, as in the storage device 105. Identification information of each learning model is further associated with the learning model.

The display unit 403 will be described next. The display unit 403 is a display screen formed by a CRT or a liquid crystal screen. Note that the display unit 403 may be the display screen of a car navigation apparatus 103.

Figure 6:
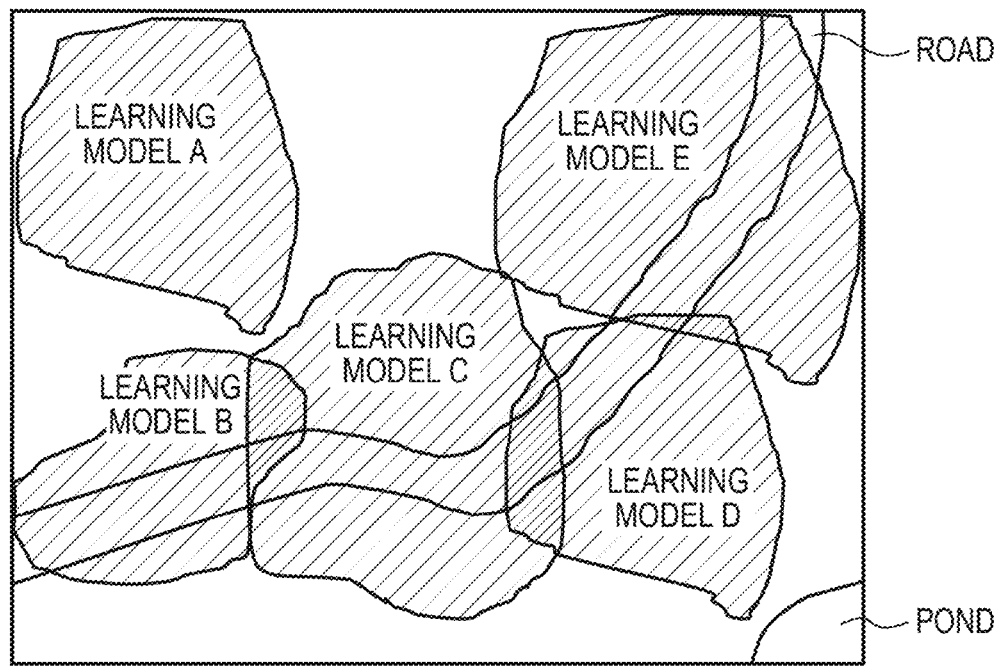
FIG. 6 is a view showing an example of the display screen of a display unit 403.

The generation unit 404 will be described next. The generation unit 404 displays a map image on the display unit 403. The map image is a map image in a range including image capturing positions represented by all pieces of image capturing position information registered in the storage device 405. For each learning model, the generation unit 404 displays, on the map image, the identification information of the learning model and encompassing region information concerning an encompassing region encompassing image capturing positions represented by all pieces of image capturing position information associated with the learning model in a superimposed manner. FIG. 6 shows an example of the display screen of the display unit 403.

In FIG. 6, the names of learning models (learning models A to E) and the boundaries of encompassing regions encompassing image capturing positions represented by all pieces of image capturing position information associated with the learning models are displayed in a superimposed manner on a map image including a road and a pond.

The information processing apparatus 400 will be described next. When the user designates the identification information or encompassing region information of a learning model on the display screen of the display unit 403 or using an operation unit (not shown), a selection unit 401 notifies an acquisition unit 402 of the designated identification information or encompassing region information. The acquisition unit 402 acquires, from the storage device 405, a learning model corresponding to the identification information or encompassing region information notified by the selection unit 401.

Processing performed by the information processing apparatus 400 will be described next with reference to the flowchart of FIG. 5. In step S500, the selection unit 401 notifies the acquisition unit 402 of identification information or encompassing region information designated by the user. In step S501, the acquisition unit 402 acquires, from the storage device 405, a learning model corresponding to the identification information or encompassing region information notified by the selection unit 401. This makes it possible to select and acquire a learning model corresponding to a region desired by the user.

<First Modification>

In place of the image capturing position information group corresponding to the learning model, encompassing region information concerning an encompassing region encompassing an image capturing position group represented by the image capturing position information group may be registered in the storage device 405 in association with the learning model.

<Second Modification>

In this modification, a plurality of learning models are registered in the storage device 405. Pieces of image capturing position information representing the image capturing positions of captured images used at the time of learning and an evaluation value (learning accuracy) representing the accuracy of the learning are associated with each of the plurality of learning models. The evaluation value is, for example, a value obtained in advance in the following way. "A value E obtained by adding, for all pixels, the absolute values of the differences in the depth value of a pixel between geometric information output from a learning model when a captured image included in learning data is input to the learning model and geometric information included in the learning data" is obtained for each learning data. Let N be the number of learning data. The reciprocal of a value obtained by dividing a sum S of the values E obtained for the learning data by N (=S/N, that is, the average value of the values E) is defined as an evaluation value. Such an evaluation value is obtained in advance for each learning model and registered in the storage device 405.

The generation unit 404 displays a map image on the display unit 403. The map image is a map image in a range including image capturing positions represented by all pieces of image capturing position information registered in the storage device 405. For each learning model, the generation unit 404 displays, on the map image, encompassing region information concerning an encompassing region encompassing image capturing positions represented by all pieces of image capturing position information associated with the learning model in a display attribute according to the evaluation value associated with the learning model.

Figure 10:
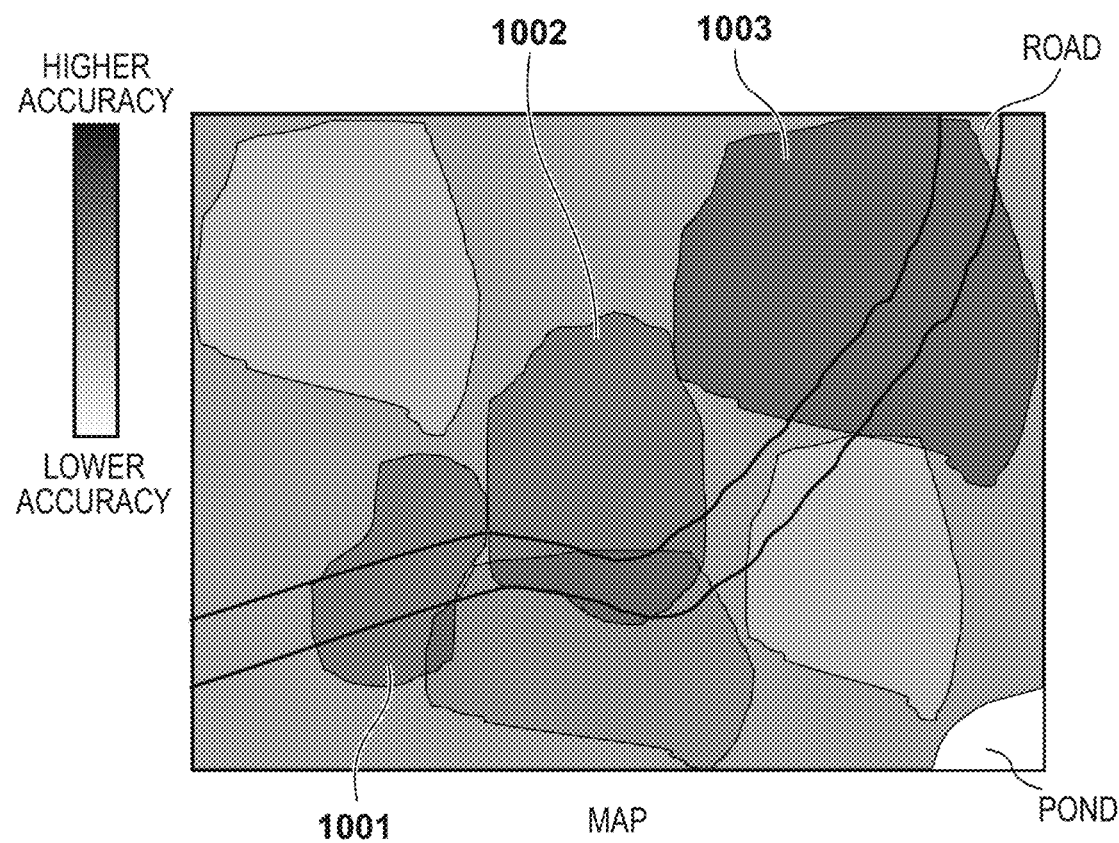
FIG. 10 is a view showing an example of display of encompassing region information.

FIG. 10 shows an example of display screen of encompassing region information by the generation unit 404. As shown in FIG. 10, each of pieces of encompassing region information 1001, 1002, and 1003 is displayed on a map image including a road and a pond in a color according to the corresponding evaluation value. In FIG. 10, encompassing region information having a higher evaluation value (higher accuracy) is displayed in a dark color, and encompassing region information having a lower evaluation value (lower accuracy) is displayed in a lighter color.

When the user designates encompassing region information on the display screen of the display unit 403 or using an operation unit (not shown), the selection unit 401 notifies the acquisition unit 402 of the encompassing region information. The acquisition unit 402 acquires, from the storage device 405, a learning model corresponding to the encompassing region information notified by the selection unit 401.

Figure 5:
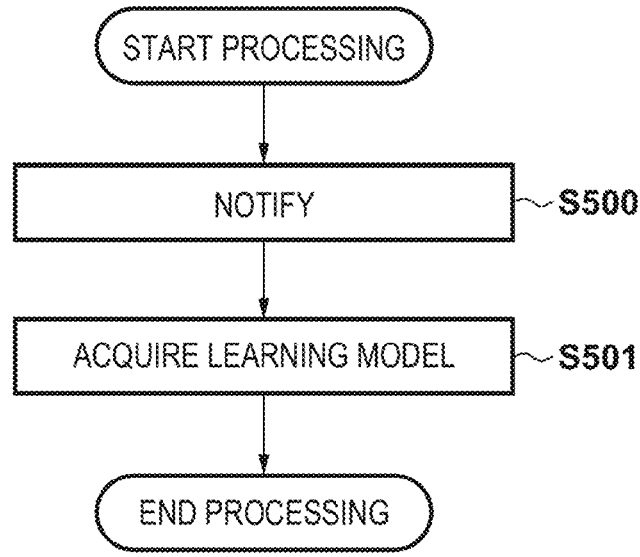
FIG. 5 is a flowchart of processing performed by an information processing apparatus 400.

In this modification, the processes of steps S500 and S501 in the flowchart of FIG. 5 are different from the second embodiment. In step S500, the selection unit 401 notifies the acquisition unit 402 of encompassing region information designated by the user. In step S501, the acquisition unit 402 acquires, from the storage device 405, a learning model corresponding to the encompassing region information notified by the selection unit 401. This allows the user to grasp and select a region corresponding to a more accurate learning model by viewing the display screen of the car navigation apparatus 103.

Note that the evaluation value need only be a value representing the accuracy of learning, as described above. For example, it may be the use frequency of a learning model or an evaluation score given by a plurality of users. Additionally, the generation unit 404 may display the evaluation value of a learning model corresponding to encompassing region information in addition to the encompassing region information.

Note that in the first and second embodiments and the modifications described above, no mention has been made concerning the use purpose of the learning model that the acquisition unit 102 (402) acquires from the storage device 105 (405). That is, the use purpose is not limited to a specific one. However, some or all of the first and second embodiments and the modifications described above or a combination of some or all of the first and second embodiments and the modifications described above may be applied to the embodiments and modifications to be described below.

Third Embodiment

In this embodiment, a case in which the system according to the first embodiment is applied to automated driving will be described. An example of the functional arrangement of a system according to this embodiment will be described first with reference to the block diagram of FIG. 7.

An image capturing device 702 is attached to an automobile 701 to capture a movie in front of the automobile 701 that is an example of a vehicle. The image (captured image) of each frame of the movie captured by the automobile 701 is sent to an information processing apparatus 700.

A car navigation apparatus 103 is the same as described in the first embodiment. In this embodiment, furthermore, information used to guide the automobile 701 to a destination point is displayed on the display screen based on the current position, route information, and the traveling direction and the moving speed of the automobile 701.

A transmission/reception device 706 performs data communication with an external device via a wireless network. The information processing apparatus 700 acquires a learning model corresponding to a setting region, like the information processing apparatus 100. Then, the information processing apparatus 700 estimates geometric information based on the acquired learning model and captured images acquired from the image capturing device 702, and obtains the position and orientation of the automobile 701 based on the geometric information. The information processing apparatus 700 sends the estimated geometric information and the position and orientation of the automobile 701 to a driving control unit 703. Here, "position and orientation" represents "position and/or orientation".

The driving control unit 703 calculates the traveling direction and the moving speed of the automobile 701 based on the geometric information estimated by the information processing apparatus 700 and the position and orientation of the automobile 701. An actuator unit 704 is a control device configured to control the motion of the automobile 701, and controls the actuator of the automobile 701 based on the traveling direction and the moving speed of the automobile 701 calculated by the driving control unit 703. Accordingly, for example, an obstacle is estimated from the geometric information based on the position of the automobile 701 itself and the peripheral geometric shape represented by the geometric information, and the speed or the traveling direction is decided such that the distance to the obstacle becomes a predetermined value or more, thereby performing driving control such as collision avoidance or acceleration/deceleration.

Figure 8:
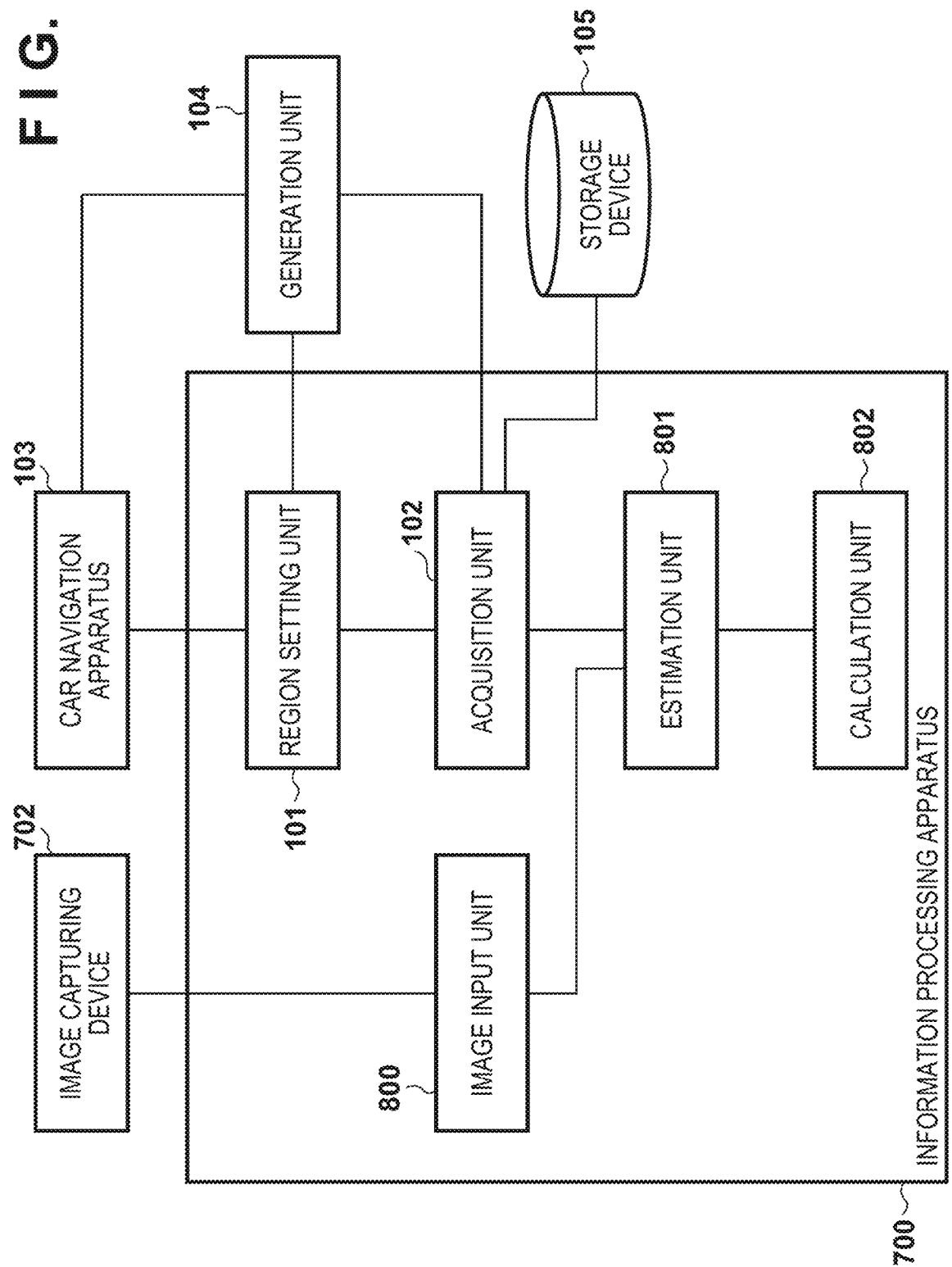
FIG. 8 is a block diagram showing an example of the functional arrangement of an information processing apparatus 700.

An example of the functional arrangement of the information processing apparatus 700 will be described next with reference to the block diagram of FIG. 8. The same reference numerals as in FIG. 1 denote the same functional units in FIG. 8, and a description thereof will be omitted.

An image input unit 800 acquires a captured image sent from the image capturing device 702 and sends the acquired captured image to an estimation unit 801 of the subsequent stage. The estimation unit 801 estimates geometric information based on one learning model selected based on the current position from learning models decided as acquisition targets by an acquisition unit 102 and the captured image from the image input unit 800. A calculation unit 802 obtains the position and orientation of the image capturing device 702 based on the geometric information estimated by the estimation unit 801, and converts the obtained position and orientation of the image capturing device 702 into the position and orientation of the automobile 701. The calculation unit 802 then outputs the converted position and orientation of the automobile 701 and the geometric information (or geometric information obtained from the geometric information) estimated by the estimation unit 801 to the driving control unit 703.

Processing performed by the information processing apparatus 700 will be described next with reference to FIG. 9 that shows the flowchart of the processing. Note that the same step numbers as in FIG. 2 denote the same processing steps in FIG. 9, and a description thereof will be omitted.

In step S900, the image input unit 800 acquires a captured image (for example, a grayscale image) sent from the image capturing device 702, and sends the acquired captured image to the estimation unit 801 of the subsequent stage.

In step S901, based on the current position acquired from the car navigation apparatus 103, the estimation unit 801 selects a learning model corresponding to the current position from learning models decided as acquisition targets by the acquisition unit 102. As the method of selecting the learning model corresponding to the current position from the learning models decided as acquisition targets by the acquisition unit 102, for example, the method described in the third modification above can be applied. The estimation unit 801 acquires, as estimated geometric information that is "the estimation result of geometric information", geometric information output from the learning model when the captured image output from the image capturing device 702 is input to the selected learning model.

Note that in a case in which a plurality of learning models are selected as the learning model corresponding to the current position, the estimation unit 801 acquires estimated geometric information by the following processing. First, for each of the plurality of selected learning models, the estimation unit 801 acquires geometric information output from the learning model when the captured image from the image capturing device 702 is input to the selected learning model. Then, the estimation unit 801 obtains, as estimated geometric information, the weighted average of the pieces of geometric information acquired for the plurality of learning models. For example, in the geometric information acquired for the plurality of learning models, the weighted average of depth values corresponding to a pixel position (x, y) of the captured image is obtained as a depth value corresponding to the pixel position (x, y) of the captured image in the estimated geometric information. The weight value for each depth value of geometric information acquired for a learning model of interest can be obtained by, for example, the following method. The longer the distance between the current position and the outline of an encompassing region encompassing an image capturing position group represented by an image capturing position information group associated with the learning model of interest is, the larger the weight value for each depth value of geometric information acquired for the learning model of interest is made. For example, the outline of the encompassing region is approximated to a plurality of line segments, and the minimum value of the distance between the current position and each line segment is obtained as the weight value.

In step S902, the calculation unit 802 obtains the position and orientation of the image capturing device 702 based on the estimated geometric information estimated by the estimation unit 801, and converts the obtained position and orientation of the image capturing device 702 into the position and orientation of the automobile 701.

The position and orientation of the image capturing device 702 according to this embodiment are defined by a total of six parameters including three parameters representing the position of the image capturing device 702 and three parameters representing the orientation on a world coordinate system. Here, the world coordinate system is a coordinate system that has its origin at a predetermined point in the physical space and uses three axes orthogonal to each other at the origin as the X-, Y-, and Z-axes. In addition, a three-dimensional coordinate system defined on the image capturing device 702, in which the optical axis of the image capturing device 702 is the Z-axis, the horizontal direction of a captured image obtained by the image capturing device 702 is the X-axis, and the vertical direction is the Y-axis, will be referred to as a camera coordinate system hereinafter.

Furthermore, a three-dimensional coordinate system that has its origin at the center of gravity position of the automobile 701, the Z-axis in the traveling direction of the automobile 701, the Y-axis in the gravity direction, and the X-axis in the left-right direction of the automobile 701 will be referred to as an automobile coordinate system hereinafter. Here, the transformation matrix from the camera coordinate system to the automobile coordinate system is obtained in advance by measurement. For example, a known marker generally used to specify a three-dimensional position may be used. More specifically, a marker placed at the center of gravity position of the automobile 701 is captured by an image capturing device, and the position and orientation of the image capturing device are calculated from the captured image. The position and orientation are used as the coordinate transformation matrix between the camera and the marker, that is, the transformation matrix between the camera coordinate system and the automobile coordinate system.

In this embodiment, the calculation unit 802 obtains the position and orientation of the image capturing device 702 on the world coordinate system (the position and orientation of the camera coordinate system on the world coordinate system), and converts the position and orientation into the position and orientation of the automobile 701 on the world coordinate system (the position and orientation of the automobile coordinate system on the world coordinate system).

An example of the method of calculating the position and orientation of the image capturing device 702 by the calculation unit 802 will be described here. More specifically, to a captured image (current frame) captured at time t, each pixel of a preceding frame is projected based on geometric information (preceding geometric information) output from a learning model when the captured image (preceding frame) captured at time f before the current frame is input to the learning model. Here, "project" means calculating a position where each pixel of the preceding frame is located in the current frame. More specifically, using image coordinates $(u_{t-1}, v_{t-1})$ of a pixel of interest in the preceding frame, internal parameters (fx, fy, cx, cy) of the image capturing device 702, and a depth value D of the pixel of interest in the preceding geometric information, the calculation unit 802 calculates $$\begin{bmatrix} X_{t-1} \\ Y_{t-1} \\ Z_{t-1} \end{bmatrix} = D \begin{bmatrix} (u_{t-1} - c_x)/f_x \\ (v_{t-1} - c_y)/f_y \\ 1 \end{bmatrix} \quad (1)$$

The calculation unit 802 can thus obtain three-dimensional coordinates $(X_{t-1}, Y_{t-1}, Z_{t-1})$ of the pixel of interest on the camera coordinate system of the preceding frame.

Here, let $t_{(t-1) \to t}$ be the position of the image capturing device 702 that has captured the current frame with respect to the position of the image capturing device 702 that has captured the preceding frame, and $R_{(t-1) \to t}$ be the orientation of the image capturing device 702 that has captured the current frame with respect to the orientation of the image capturing device 702 that has captured the preceding frame. At this time, using $t_{(t-1) \to t}$ and $R_{(t-1) \to t}$, the calculation unit 802 calculates $$\begin{bmatrix} X_t \\ Y_t \\ Z_t \\ 1 \end{bmatrix} = \begin{bmatrix} R_{(t-1) \to t} & T_{(t-1) \to t} \\ 0 & 1 \end{bmatrix} \begin{bmatrix} X_{t-1} \\ Y_{t-1} \\ Z_{t-1} \\ 1 \end{bmatrix} \quad (2)$$

thereby obtaining three-dimensional coordinates $(X_t, Y_t, Z_t)$ of the pixel of interest on the camera coordinate system of the current frame.

Next, the calculation unit 802 calculates $$\begin{bmatrix} u_t \\ v_t \end{bmatrix} = \begin{bmatrix} f_x X_t/Z_t + c_x \\ f_y Y_t/Z_t + c_y \end{bmatrix} \quad (3)$$

thereby converting the three-dimensional coordinates $(X_t, Y_t, Z_t)$ of the pixel of interest on the camera coordinate system of the current frame into image coordinates $(u_t, v_t)$ of the current frame.

In this embodiment, processing according to equations (1) to (3) above is called projection. The calculation unit 802 performs such projection for all pixels of interest in the preceding frame, thereby obtaining corresponding image coordinates in the current frame. Then, the calculation unit 802 calculates $t_{(t-1) \to t}$ and $R_{(t-1) \to t}$ such that the luminance difference between the luminance value of a pixel at the image coordinates $(u_{t-1}, v_{t-1})$ in the preceding frame and the luminance value of a pixel (the image coordinates are $(u_t, v_t)$) in the current frame as the projection destination of the pixel becomes minimum.

Using the position $t_{w \to (t-1)}$ and the orientation $R_{w \to (t-1)}$ of the image capturing device 702, which has captured the preceding frame, on the world coordinate system, the calculation unit 802 calculates $$\begin{bmatrix} R_{w \to t} & t_{w \to t} \\ 0 & 1 \end{bmatrix} = \begin{bmatrix} R_{(t-1) \to t} & t_{(t-1) \to t} \\ 0 & 1 \end{bmatrix} \begin{bmatrix} R_{w \to (t-1)} & t_{w \to (t-1)} \\ 0 & 1 \end{bmatrix} \quad (4)$$

The calculation unit 802 thus calculates a position $t_{w \to t}$ and an orientation $R_{w \to t}$ of the image capturing device 702, which has captured the current frame, on the world coordinate system.

Then, using a transformation matrix M obtained in advance between the camera coordinate system and the automobile coordinate system, the calculation unit 802 calculates $$\begin{bmatrix} R'_{w \to t} & t'_{w \to t} \\ 0 & 1 \end{bmatrix} = M \begin{bmatrix} R_{w \to t} & t_{w \to t} \\ 0 & 1 \end{bmatrix} \quad (5)$$

The calculation unit 802 thus converts the position $t_{w \to t}$ and the orientation $R_{w \to t}$ of the image capturing device 702, which has captured the current frame, on the world coordinate system into a position $t'_{w \to t}$ and an orientation $R'_{w \to t}$ of the automobile 701 on the world coordinate system.

The calculation unit 802 outputs the converted position and orientation of the automobile 701 and the geometric information estimated by the estimation unit 801 (or weighted and averaged geometric information) to the driving control unit 703.

Figure 9:
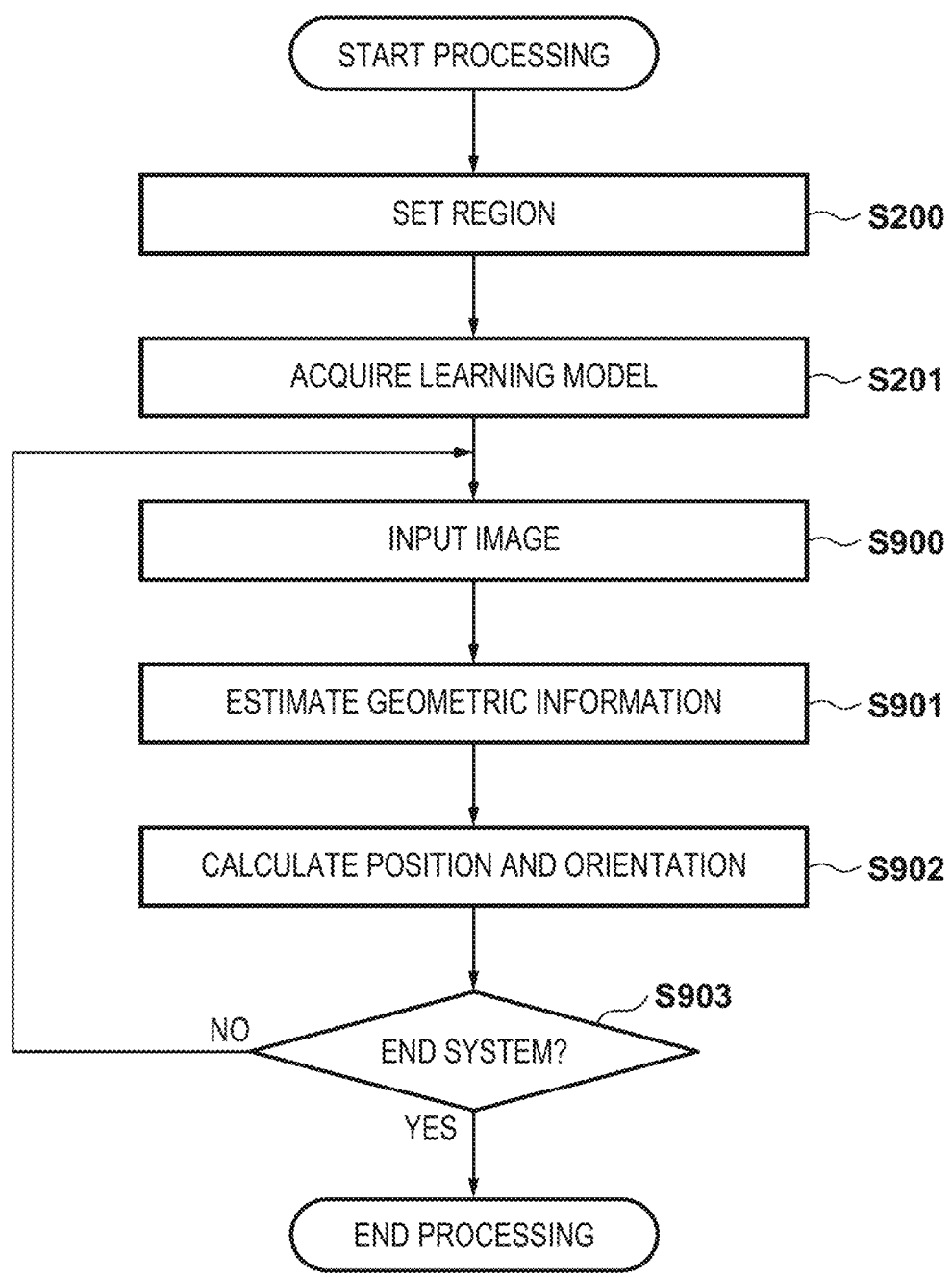
FIG. 9 is a flowchart of processing performed by the information processing apparatus 700.

If the end condition of the processing according to the flowchart of FIG. 9 is satisfied, the processing according to the flowchart of FIG. 9 ends. If the end condition is not satisfied, the process returns to S900. For example, if the automobile 701 arrives at the destination point, or the driver or passenger in the automobile 701 instructs stop of the system on the display screen of the car navigation apparatus 103, it is determined that the end condition is satisfied.

As described above, according to this embodiment, it is possible to acquire a learning model necessary for automated driving. Note that in this embodiment, the storage device 105 is provided in the automobile 701, as described above. However, the storage device 105 may be an external device (for example, a server apparatus) capable of communicating with the transmission/reception device 706. In this case, the acquisition unit 102 may control the transmission/reception device 706 and acquire necessary information from the storage device 105 serving as an external device.

In addition, various kinds of information described as information registered in the storage device 105 may be registered in an external device, and a learning model or various kinds of information that the acquisition unit 102 has received from the external device by controlling the transmission/reception device 706 may be downloaded to the storage device 105. According to this arrangement, information downloaded to the storage device 105 once need not be acquired again by accessing the external device.

Fourth Embodiment

Figure 7:
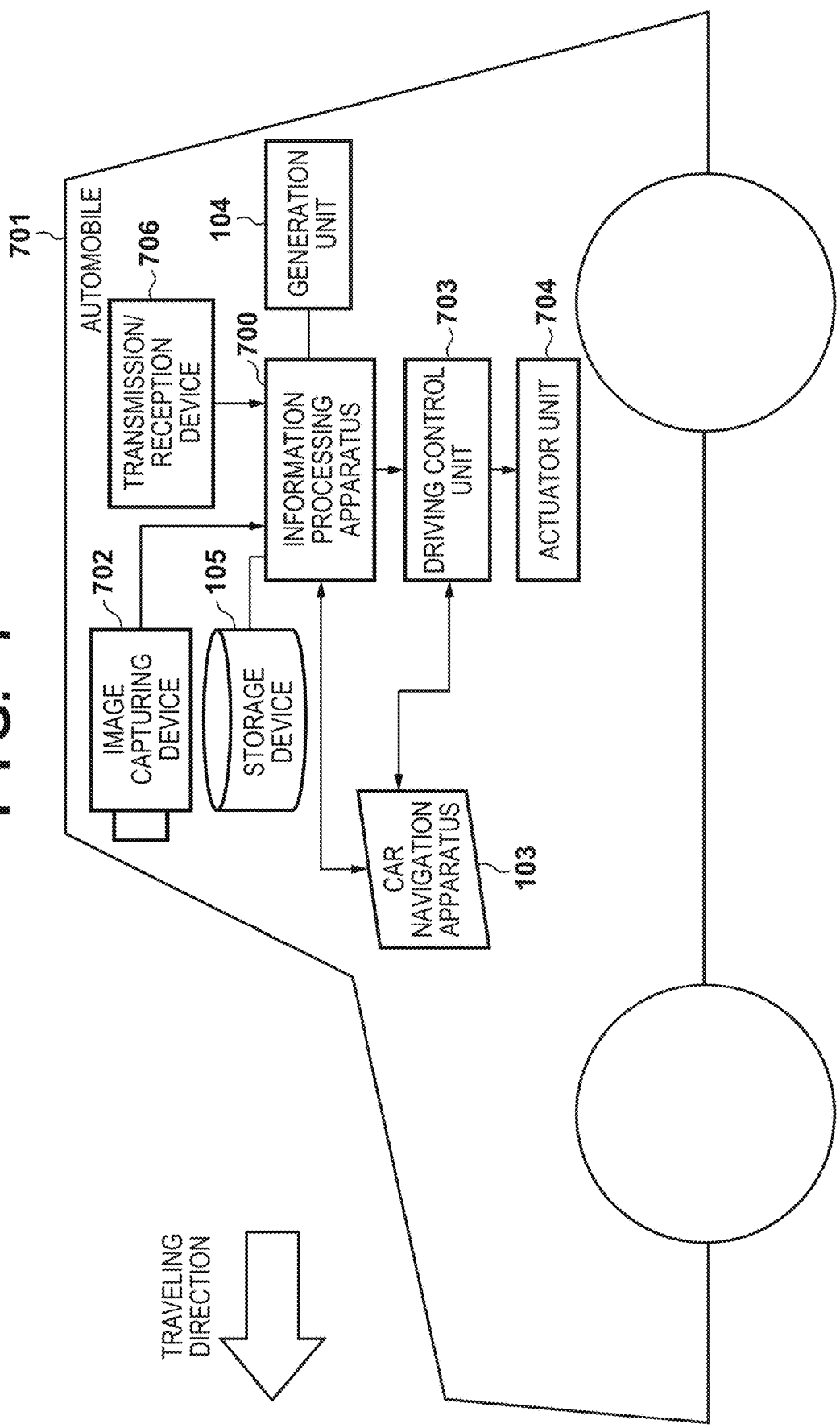
FIG. 7 is a block diagram showing an example of the functional arrangement of a system.
Figure 11:
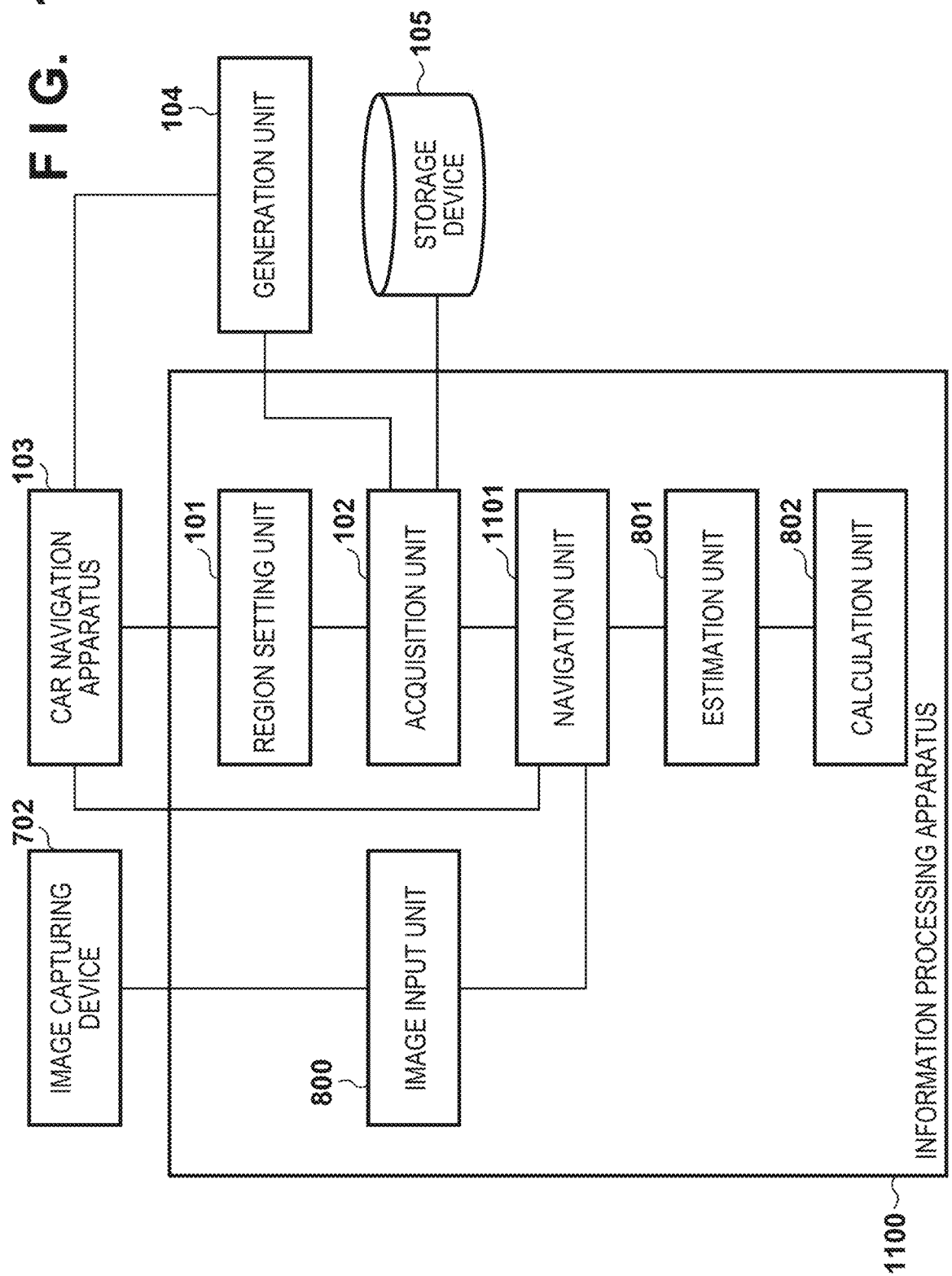
FIG. 11 is a block diagram showing an example of the functional arrangement of an information processing apparatus 1100.

In this embodiment, the information processing apparatus 700 shown in FIG. 7 is replaced with an information processing apparatus 1100 shown in FIG. 11. As shown in FIG. 11, the information processing apparatus 1100 is formed by adding a navigation unit 1101 to the information processing apparatus 700. FIG. 11 is a block diagram showing an example of the functional arrangement of the information processing apparatus 1100.

Note that a region setting unit 101 according to this embodiment sets, as a setting region, a region in which the user wants to execute automated driving. For example, when the user sets a region to execute automated driving on a map image displayed on the display screen of a car navigation apparatus 103, the car navigation apparatus 103 sends information representing the region set by the user to the information processing apparatus 1100. The region setting unit 101 sets, as a setting region, the region (the region set by the user) represented by the information received from the car navigation apparatus 103. An acquisition unit 102 acquires a learning model corresponding to the setting region from a storage device 105, as in the first embodiment.

The navigation unit 1101 obtains an encompassing region encompassing an image capturing position information group associated with the learning model acquired by the acquisition unit 102. Then, the navigation unit 1101 acquires a departure point and a destination point from route information output from the car navigation apparatus 103, and searches for a route with the shortest distance as a route directed from the departure point to the destination point via the encompassing region.

Figure 12:
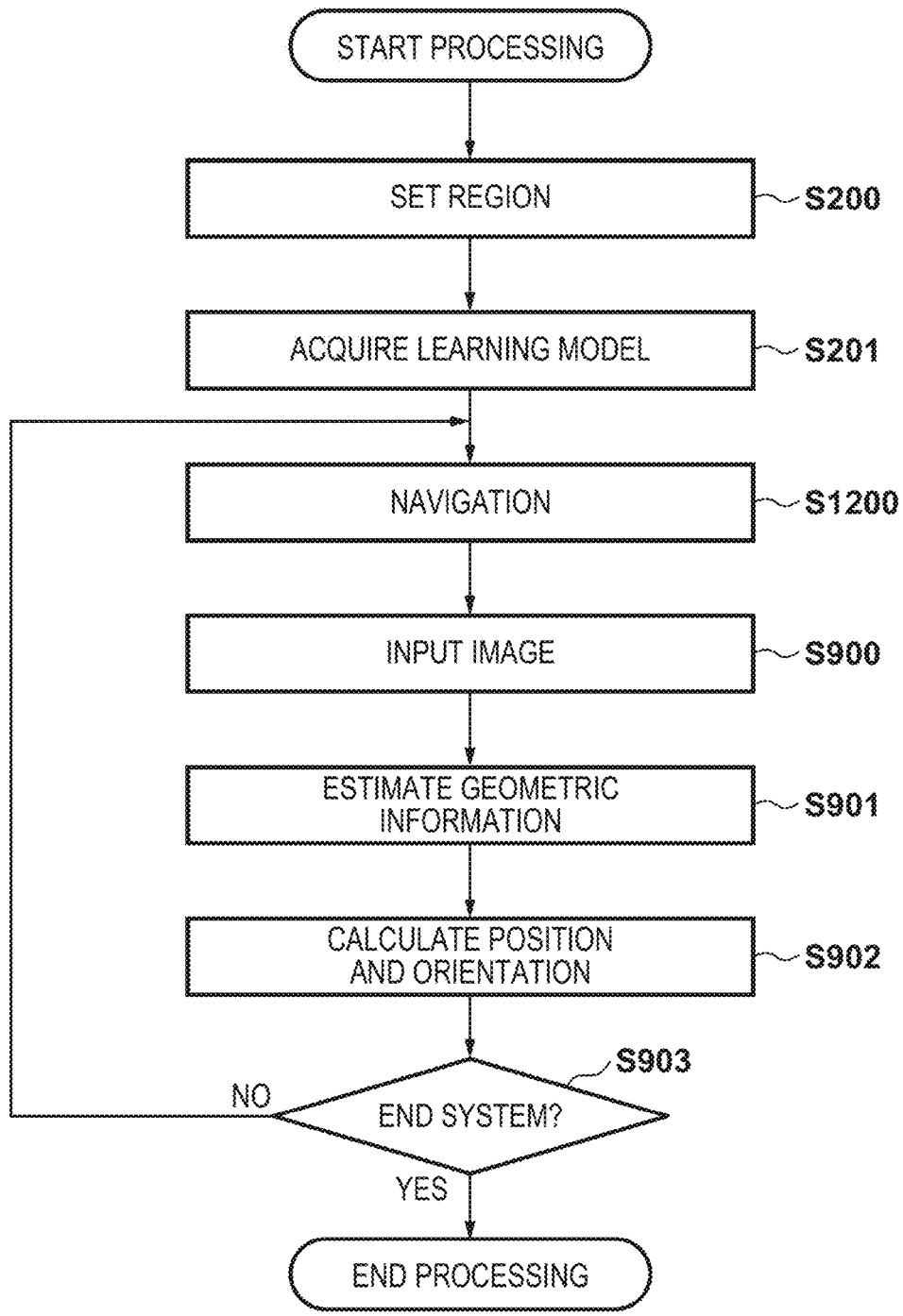
FIG. 12 is a flowchart of processing performed by the information processing apparatus 1100.

Processing performed by the information processing apparatus 1100 will be described with reference to the flowchart of FIG. 12. The same step numbers as in FIGS. 2 and 9 denote the same processing steps in FIG. 12, and a description thereof will be omitted. Note that in step S200, the region setting unit 101 sets, as a setting region, a region in which the user wants to execute automated driving. In step S201, the acquisition unit 102 acquires a learning model corresponding to the setting region set in step S200 from the storage device 105.

In step S1200, the navigation unit 1101 obtains an encompassing region encompassing an image capturing position information group associated with the learning model acquired by the acquisition unit 102. Then, the navigation unit 1101 acquires a departure point and a destination point from route information output from the car navigation apparatus 103, and searches for a route with the shortest distance as a route directed from the departure point to the destination point via the encompassing region. The shortest route found by the navigation unit 1101 is displayed by a generation unit 104 on the display screen of the car navigation apparatus 103.

<Modification>

When the navigation unit 1101 founds a plurality of routes as "the route directed from the departure point to the destination point via the encompassing region" in step S1200, the generation unit 104 may display the plurality of found routes on the display screen of the car navigation apparatus 103. In this case, the user selects one of the plurality of routes by operating the car navigation apparatus 103.

Fifth Embodiment

Figure 13:
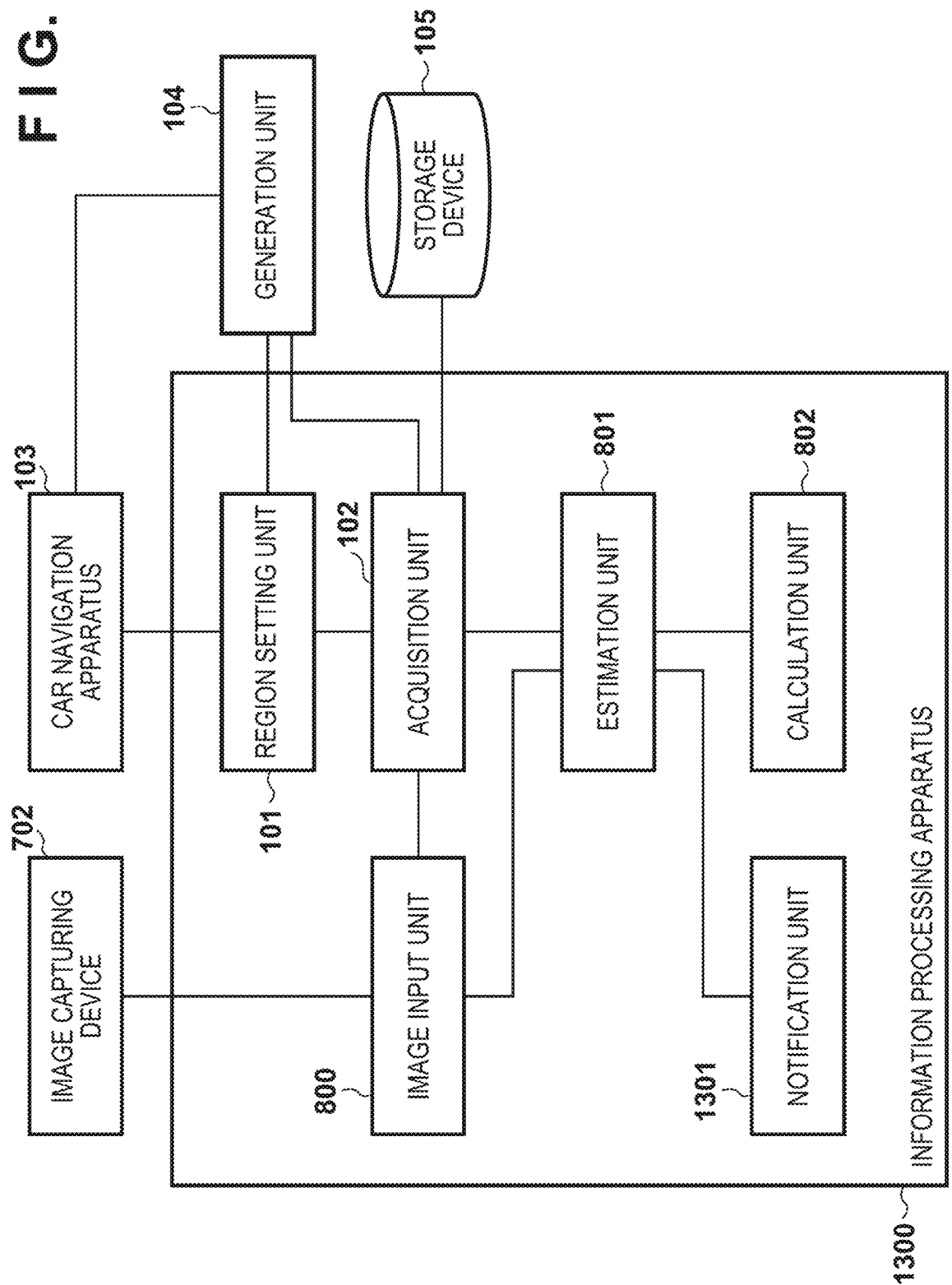
FIG. 13 is a block diagram showing an example of the functional arrangement of an information processing apparatus 1300.

In this embodiment, the information processing apparatus 700 shown in FIG. 7 is replaced with an information processing apparatus 1300 shown in FIG. 13. As shown in FIG. 13, the information processing apparatus 1300 is formed by adding a notification unit 1301 to the information processing apparatus 700. FIG. 13 is a block diagram showing an example of the functional arrangement of the information processing apparatus 1300.

An estimation unit 801 according to this embodiment estimates estimated geometric information based on a learning model and a captured image, as in the third embodiment. In this embodiment, the estimation unit 801 obtains an evaluation value representing the degree of matching between the learning model and the captured image. If the evaluation value obtained by the estimation unit 801 is less than a predetermined value, the notification unit 1301 notifies the user of it (that the acquired learning model is not appropriate).

Figure 14:
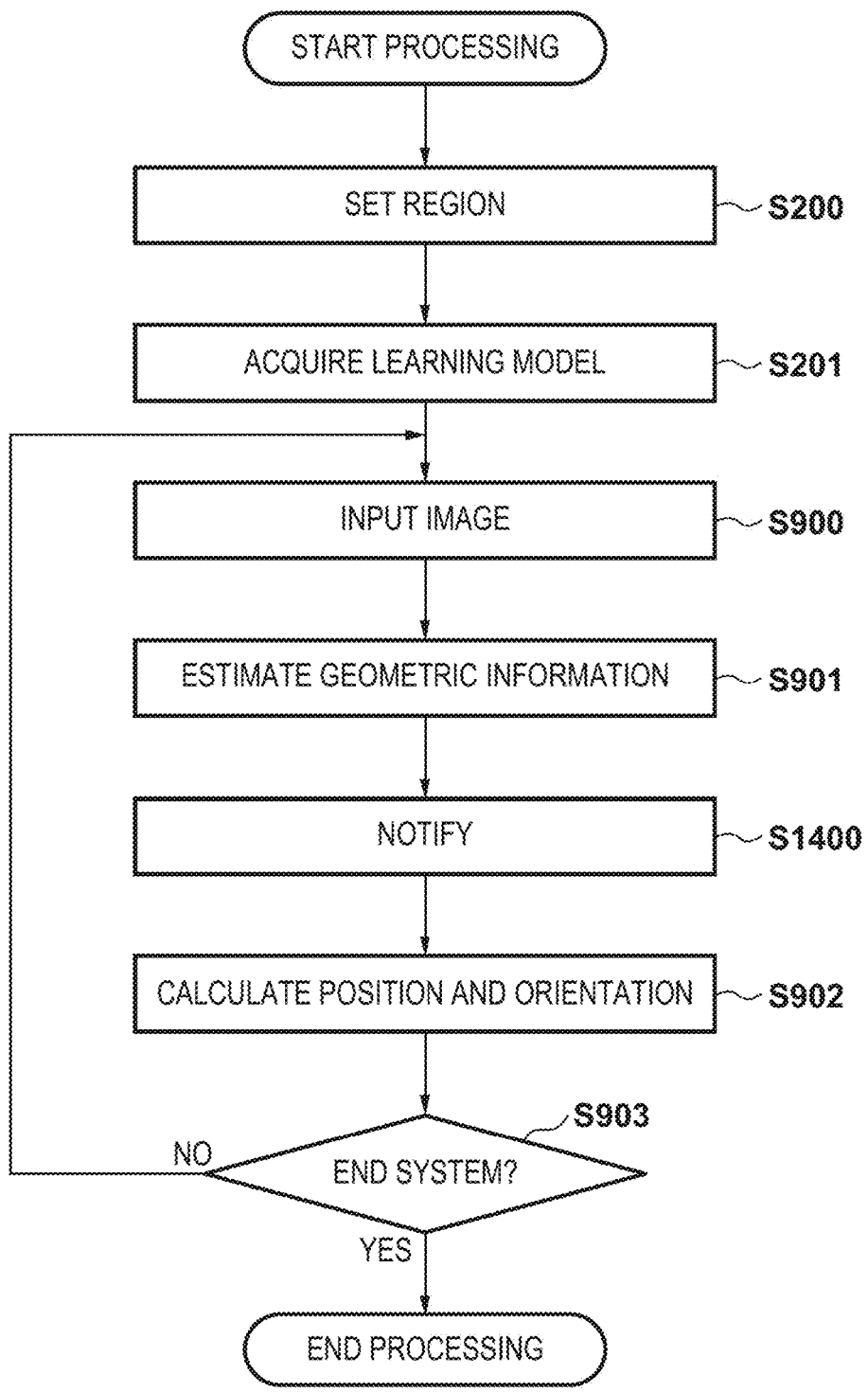
FIG. 14 is a flowchart of processing performed by the information processing apparatus 1300.

Processing performed by the information processing apparatus 1300 will be described with reference to FIG. 14 that shows the flowchart of the processing. The same step numbers as in FIGS. 2 and 9 denote the same processing steps in FIG. 14, and a description thereof will be omitted.

In step S901 according to this embodiment, the estimation unit 801 estimates estimated geometric information based on a learning model and a captured image, as in the third embodiment. The estimation unit 801 also obtains an evaluation value representing the degree of matching between the learning model and the captured image. The evaluation value is obtained, for example, in the following way. The estimation unit 801 obtains, as the evaluation value, the reciprocal of the sum of the differences (absolute values) in the depth value of each pixel between geometric information output from a learning model when a captured image is input to the learning model and geometric information estimated from only the captured image. As a method of estimating the geometric information from only the captured image, for example, the following method can be applied. The estimation unit 801 acquires a first captured image captured by an image capturing device 702 at first time t and a second captured image captured by the image capturing device 702 at second time (t+1) after the image capturing device 702 is moved by a predetermined moving amount (for example, 10 cm in the X-axis direction on the camera coordinate system). The estimation unit 801 then obtains geometric information by a motion stereo method from the first captured image and the second captured image. Note that the scale of the depth is defined using the above-described predetermined moving amount as a baseline length.

In step S1400, if the evaluation value obtained by the estimation unit 801 in step S901 is less than a predetermined value, the notification unit 1301 notifies the user of it. The notification method by the notification unit 1301 is not limited to a specific notification method. For example, a message "the degree of matching between the learning model and the captured image is low" or a corresponding image may be displayed on the display screen of a car navigation apparatus 103, or the evaluation value itself may be displayed. If the car navigation apparatus 103 has a voice output function, a message corresponding to the evaluation value may be notified to the user by voice.

Note that if the evaluation value obtained by the estimation unit 801 in step S901 is equal to or more than the predetermined value, the notification unit 1301 may notify the user of it. The notification method is not limited to a specific notification method, as described above.

<Modification>

The method of obtaining the evaluation value by the estimation unit 801 is not limited to a specific obtaining method. That is, the estimation unit 801 can obtain any value as the evaluation value as long as it is a value representing the degree of matching between a learning model and an input image. For example, the reciprocal of the difference between the image capturing position of a captured image used at the time of learning of a learning model and the image capturing position of a captured image acquired from the image capturing device 702 may be obtained as the evaluation value.

The above-described various kinds of operation methods (for example, the method of designating a region or a position on a map image) by the user are not limited to a specific operation method. For example, if the display screen of the car navigation apparatus 103 is a touch panel screen, the user may designate a region or a position on a map image by performing an operation input to the touch panel screen. Alternatively, the user may designate a region or a position on a map image by, for example, operating a button group provided on the car navigation apparatus 103.

In the above-described embodiments and modifications, the information processing apparatus performs processing such as setting of a setting region based on information from the car navigation apparatus 103. However, the present invention is not limited to this form. For example, information obtained from the car navigation apparatus 103 may be temporarily saved in a device such as a server apparatus, and the information processing apparatus may acquire the information from the server apparatus and perform the processing such as setting of a setting region. In addition, the information processing apparatus may perform the same processing based on information from a device such as a tablet terminal or a smartphone in place of the car navigation apparatus 103.

Note that some or all of the above-described embodiments and modifications may be appropriately combined. In addition, some or all of the above-described embodiments and modifications may be selectively used.

Sixth Embodiment

Figure 15:
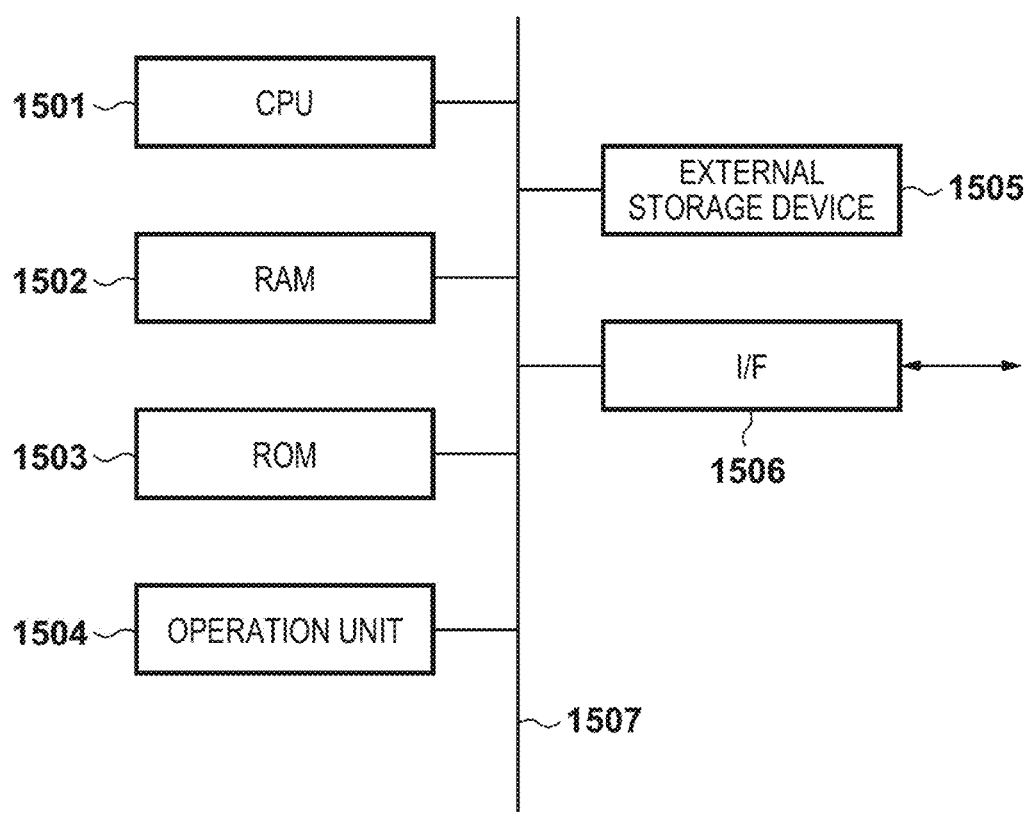
FIG. 15 is a block diagram showing an example of the hardware arrangement of a computer apparatus.

Each functional unit of information processing apparatus 100 (FIG. 1), 400 (FIG. 4), 700 (FIG. 8), 1100 (FIG. 11), or 1300 (FIG. 13) may be implemented by hardware or may be implemented by software (computer program). In the latter case, a computer apparatus including a processor capable of executing the computer program can be applied to the above-described information processing apparatus 100, 400, 700, 1100, or 1300. An example of the hardware arrangement of the computer apparatus will be described with reference to the block diagram of FIG. 15.

A CPU 1501 executes various kinds of processing using computer programs or data stored in a RAM 1502 or a ROM 1503. The CPU 1501 thus controls the operation of the entire computer apparatus and executes or controls each processing described above as processing to be performed by the information processing apparatus 100, 400, 700, 1100, or 1300.

The RAM 1502 has an area to store a computer program and data loaded from the ROM 1503 or an external storage device 1505 or data received from the outside via an I/F (interface) 1506. The RAM 1502 further has a work area used by the CPU 1501 to execute various kinds of processing. In this way, the RAM 1502 can appropriately provide various kinds of areas. The ROM 1503 stores a computer program and data, which need not be rewritten.

An operation unit 1504 is formed by a user interface such as a mouse, a keyboard, a touch panel, or a button group, and the user can input various kinds of instructions to the CPU 1501 by operating the operation unit 1504.

The external storage device 1505 is a mass information storage device such as a hard disk drive or a nonvolatile memory. An OS (Operating System) is saved in the external storage device 1505. In addition, computer programs and data configured to cause the CPU 1501 to execute each processing described above as processing to be performed by the information processing apparatus 100, 400, 700, 1100, or 1300 are saved in the external storage device 1505.

The computer programs saved in the external storage device 1505 include computer programs configured to cause the CPU 1501 to implement the functions of the functional units of the information processing apparatus 100, 400, 700, 1100, or 1300. In addition, the data saved in the external storage device 1505 include data described as known information in the above explanation.

The computer programs and data saved in the external storage device 1505 are appropriately loaded into the RAM 1502 under the control of the CPU 1501 and processed by the CPU 1501.

The I/F 1506 functions as an interface configured to perform data communication with an external device. Examples of the external device are a car navigation apparatus 103, a display unit 403, a generation unit 104 (404), a storage device 105 (405), an image capturing device 702, a transmission/reception device 706, and a driving control unit 703. In addition, the I/F 1506 may be provided for each external device.

All the CPU 1501, the RAM 1502, the ROM 1503, the operation unit 1504, the external storage device 1505, and the I/F 1506 are connected to a bus 1507. Note that the external storage device 1505 may store each information described above as information registered in the above-described storage device 105 (405).

In addition, the above-described generation unit 104 (404) may also be implemented by hardware or may be implemented by a computer program. In the latter case, the computer program is saved in the above-described external storage device 1505.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-004471, filed Jan. 15, 2018, which is hereby incorporated by reference herein in its entirety.

What is claimed is:

1. An information processing apparatus comprising:
one or more memories storing instructions; and
one or more processors coupled to the one or more memories and that execute the stored instructions to function as:
a setting unit that designates a plurality of set regions each encompassing a location from among a plurality of locations along a route;
an acquiring unit that acquires, at a current location along the route, learned models from among a plurality of learned models, wherein each learned model has been trained using a different set of training images and processes an input image to output depth information corresponding to the input image, and wherein the set of training images for each of the acquired learned models include at least a predetermined number of images each being acquired at a location within a set region that encompasses the current location; and
an estimation unit that computes a weighted average of depth information output by each of the acquired learned models using the current image as the input and designates the weighted average as estimated depth information for the current image.

2. The apparatus according to claim 1, wherein the current location is designated by a user and at least one of the plurality of set regions encompasses the current location.

3. The apparatus according to claim 2, wherein the plurality of locations include at least a departure point, a destination point, a way point, and the current location on the route.

4. The apparatus according to claim 1, wherein the setting unit designates the plurality of set regions on a map image.

5. The apparatus according to claim 1, wherein the acquiring unit acquires the at least one learned model at a timing based on a time needed to acquire the at least one learned model and a moving speed of the information processing apparatus.

6. The apparatus according to claim 1, wherein the at least one learned model is trained in a physical environment corresponding to the current location.

7. The apparatus according to claim 1, wherein:
the one or more processors further function as a calculating unit that obtains a position and an orientation of the image capturing device at the current location at a time when the current image was captured, based on the estimated depth information corresponding to the current image, and
the position and the orientation are on a predetermined world coordinate system.

8. The apparatus according to claim 1, wherein the one or more processors further function as a searching unit that searches for a route from a departure point to a destination point based on a region that includes the capturing location of at least one training images for at least one of the plurality of learned models.

9. The apparatus according to claim 1, wherein the one or more processors further function as:
an evaluating unit that obtains an evaluation value of a learned model based on a captured image processed by the learned model and the corresponding depth information estimated by the learned model; and
a notifying unit that generates a notification according to the evaluation value.

10. The apparatus according to claim 1, wherein the depth information is a depth map that holds a depth value corresponding to each pixel of the captured image.

11. An information processing method performed by an information processing apparatus, the method comprising:
designating a plurality of set regions each encompassing a location from among a plurality of locations along a route;
acquiring, at a current location along the route, learned models from among a plurality of learned models, wherein each learned model has been trained using a different set of training images and processes an input image to output depth information corresponding to the input image, and wherein the set of training images for each of the acquired learned models include at least a predetermined number of images each being acquired at a location within a set region that encompasses the current location; and
computing a weighted average of depth information output by each of the acquired learned models using the current image as the input and designates the weighted average as estimated depth information for the current image.

12. A non-transitory, computer-readable storage medium storing a computer program executable by a computer to execute a method comprising:
designating a plurality of set regions each encompassing a location from among a plurality of locations along a route;
acquiring, at a current location along the route, learned models from among a plurality of learned models, wherein each learned model has been trained using a different set of training images and processes an input image to output depth information corresponding to the input image, and wherein the set of training images for each of the acquired learned models include at least a predetermined number of images each being acquired at a location within a set region that encompasses the current location; and
computing a weighted average of depth information output by each of the acquired learned models using the current image as the input and designates the weighted average as estimated depth information for the current image.

13. An information processing apparatus comprising:
one or more memories storing instructions; and
one or more processors coupled to the one or more memories and that execute the instructions to function as:
a setting unit that designates a plurality of set regions each encompassing a location from among a plurality of locations along a route;
a presenting unit that presents, for each of a plurality of learned models, information representing a region encompassing image capturing locations of images used for training the each learned model;
an acquiring unit that acquires, at a current location along the route, learned models from among the plurality of learned models, wherein each learned model has been trained using a different set of training images and processes an input image to output depth information corresponding to the input image, and wherein the set of training images for each of the acquired learned models include at least a predetermined number of images each being acquired at a location within a set region that encompasses the current location; and
an estimation unit that computes a weighted average depth information output by each of the acquired learned models using the current image as the input and designates the weighted average as estimated depth information for the current image.

14. The apparatus according to claim 13, wherein for each of the plurality of learned models, the information representing the region is presented in a display attribute corresponding to a learning accuracy of the each learned model.

15. An information processing method performed by an information processing apparatus, the method comprising:
designating a plurality of set regions each encompassing a location from among a plurality of locations along a route;
presenting, for each of a plurality of learned models, information representing a region encompassing image capturing locations of images used for training the each learned model;
acquiring, at a current location along the route, learned models from among the plurality of learned model, wherein each learned model has been trained using a different set of training images and processes an input image to output depth information corresponding to the input image, and wherein the set of training images for each of the acquired learned models include at least a predetermined number of images each being acquired at a location within a set region that encompasses the current location; and computing a weighted average depth information output by each of the acquired learned models using the current image as the input and designates the weighted average as estimated depth information for the current image.

16. A non-transitory, computer-readable storage medium storing a computer program executable by a computer to execute a method comprising:

designating a plurality of set regions each encompassing a location from among a plurality of locations along a route;

presenting, for each of a plurality of learned models, information representing a region encompassing image capturing locations of images used for training the each learned model;

acquiring, at a current location along the route, learned models from among the plurality of learned model, wherein each learned model has been trained using a different set of training images and processes an input image to output depth information corresponding to the input image, and wherein the set of training images for each of the acquired learned models include at least a predetermined number of images each being acquired at a location within a set region that encompasses the current location; and computing a weighted average depth information output by each of the acquired learned models using the current image as the input and designates the weighted average as estimated depth information for the current image.

* * * * *